US012670792B2

(12) United States Patent
Diamond et al.

(10) Patent No.: US 12,670,792 B2
(45) Date of Patent: Jun. 30, 2026

(54) TRAFFIC MANAGEMENT SYSTEM AND METHOD

(71) Applicant: Ford Global Technologies, LLC, Dearborn, MI (US)

(72) Inventors: Brendan Diamond, Grosse Pointe, MI (US); Keith Weston, Canton, MI (US); Anthony Maraldo, Southgate, MI (US); Stuart C. Salter, White Lake, MI (US); John Robert Van Wiemeersch, Novi, MI (US)

( * ) Notice: Subject to any disclaimer, the term of this patent is extended or adjusted under 35 U.S.C. 154(b) by 159 days.

(21) Appl. No.: 18/405,515

(22) Filed: Jan. 5, 2024

(65) Prior Publication Data

US 2025/0225870 A1 Jul. 10, 2025

(51) Int. Cl.
*G08G 1/0967* (2006.01)
*G08G 1/01* (2006.01)
*G08G 1/0968* (2006.01)

(52) U.S. Cl.
CPC ..... *G08G 1/096791* (2013.01); *G08G 1/0112* (2013.01); *G08G 1/0968* (2013.01)

(58) Field of Classification Search
CPC .. G05D 1/0238; G05D 1/0282; G05D 1/0287; G05D 1/0291; G05D 1/0297; G08G 1/096791; G08G 1/0112; G08G 1/096
See application file for complete search history.

(56) References Cited

U.S. PATENT DOCUMENTS 11,823,565 B2 * 11/2023 Shivarkar ............ G08G 1/0141
2010/0045488 A1 * 2/2010 Bell ....................... G08G 1/161 340/988
2013/0106620 A1 * 5/2013 Cao ........................ G08G 1/082 340/911

(Continued)

FOREIGN PATENT DOCUMENTS

CN 116432783 A * 7/2023 ............. G06Q 10/02
JP 6443491 B2 12/2018
KR 20230075202 A 5/2023

OTHER PUBLICATIONS

Translation of CN-116432783-A retrieved from Espacenet on Jul. 14, 2025 (Year: 2025).*

(Continued)

*Primary Examiner* — Fadey S. Jabr
*Assistant Examiner* — Faris Asim Shaikh
(74) *Attorney, Agent, or Firm* — Joseph Zane; Eversheds Sutherland (US) LLP

(57) ABSTRACT

A traffic management system is disclosed. The system may include a transceiver configured to receive inputs from a sensor suite located in proximity to a first location, and a processor configured to obtain the inputs from the transceiver. The processor may be further configured to determine a count of vehicles in a vehicle queue in proximity to the first location and/or a vehicle queue length based on the inputs. The processor may further determine that a predefined condition may be met based on the count of vehicles (Continued)

and/or the vehicle queue length. The processor may determine a presence of a vehicle behind a point of interest in the vehicle queue based on the inputs responsive to determining that the predefined condition is met, and transmit an instruction to the vehicle to move to a second location responsive to determining the vehicle presence.

17 Claims, 6 Drawing Sheets

(56) References Cited

U.S. PATENT DOCUMENTS

| | | | | |
|---|---|---|---|---|
| 2017/0337571 | A1* | 11/2017 | Bansal | G07C 5/008 |
| 2018/0308355 | A1* | 10/2018 | Jiang | G08G 1/096783 |
| 2019/0056230 | A1* | 2/2019 | Hatav | G08G 1/09626 |
| 2019/0141487 | A1* | 5/2019 | Jiang | H04W 72/20 |
| 2019/0172344 | A1* | 6/2019 | Baik | G08G 1/0141 |
| 2019/0205907 | A1* | 7/2019 | Bansal | H04W 4/80 |
| 2019/0236952 | A1* | 8/2019 | Suzuki | G08G 1/0133 |
| 2020/0035096 | A1* | 1/2020 | Sun | G08G 1/095 |
| 2020/0111370 | A1* | 4/2020 | Dyer | B60W 60/00253 |
| 2020/0410412 | A1* | 12/2020 | Linguanti | A63G 7/00 |
| 2021/0118307 | A1* | 4/2021 | Kim | G10L 15/26 |
| 2022/0301044 | A1* | 9/2022 | Löthman | G06Q 30/0645 |
| 2023/0041498 | A1 | 2/2023 | Weston et al. | |
| 2024/0304084 | A1* | 9/2024 | Cabrera Castillo | G07C 9/15 |
| 2025/0136101 | A1* | 5/2025 | Schad | B60W 30/09 |
| 2025/0148841 | A1* | 5/2025 | Onimaru | G09B 29/10 |

OTHER PUBLICATIONS

Yue Cao, et.al., Toward Anycasting-Driven Reservation System for Electric Vehicle Battery Switch Service, IEEE Systems Journal, May 8, 2018, pp. 1-16.

Siva Karthikeyan Krishnan, et.al., Sustainability Priorities With Quick Service Restaurant Via Drive Thru Mode, Dogo Rangsang Research Journal, https://www.researchgate.net/publication/373049937, Jan. 2023, pp. 164-169.

Parsa Aghaei, et.al., Drive-Through Urgent Care Centers: Could They Be the Future of Healthcare Facilities?, Health Environments Research & Design Journal, Mar. 28, 2022, pp. 56-66, vol. 15(3).

* cited by examiner

TRAFFIC MANAGEMENT SYSTEM AND METHOD

FIELD

The present disclosure relates to a traffic management system and method for preventing traffic build-up in proximity to locations of interest.

BACKGROUND

It is known that traffic builds up in proximity to locations of interest during peak hours. Such locations may include, for example, popular restaurants, drive-through at popular food chain stores, sports arenas/venues during match time, and/or the like. For example, there are known instances of long vehicle queues during morning and evening times at drive-through of popular food chain stores. In some instances, the long vehicle queues extend to the main highway or roadway adjacent to the food chain store, leading to traffic jams and causing inconvenience to commuters.

Thus, there is a need for a system that prevents traffic build-up in proximity to such locations of interest.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
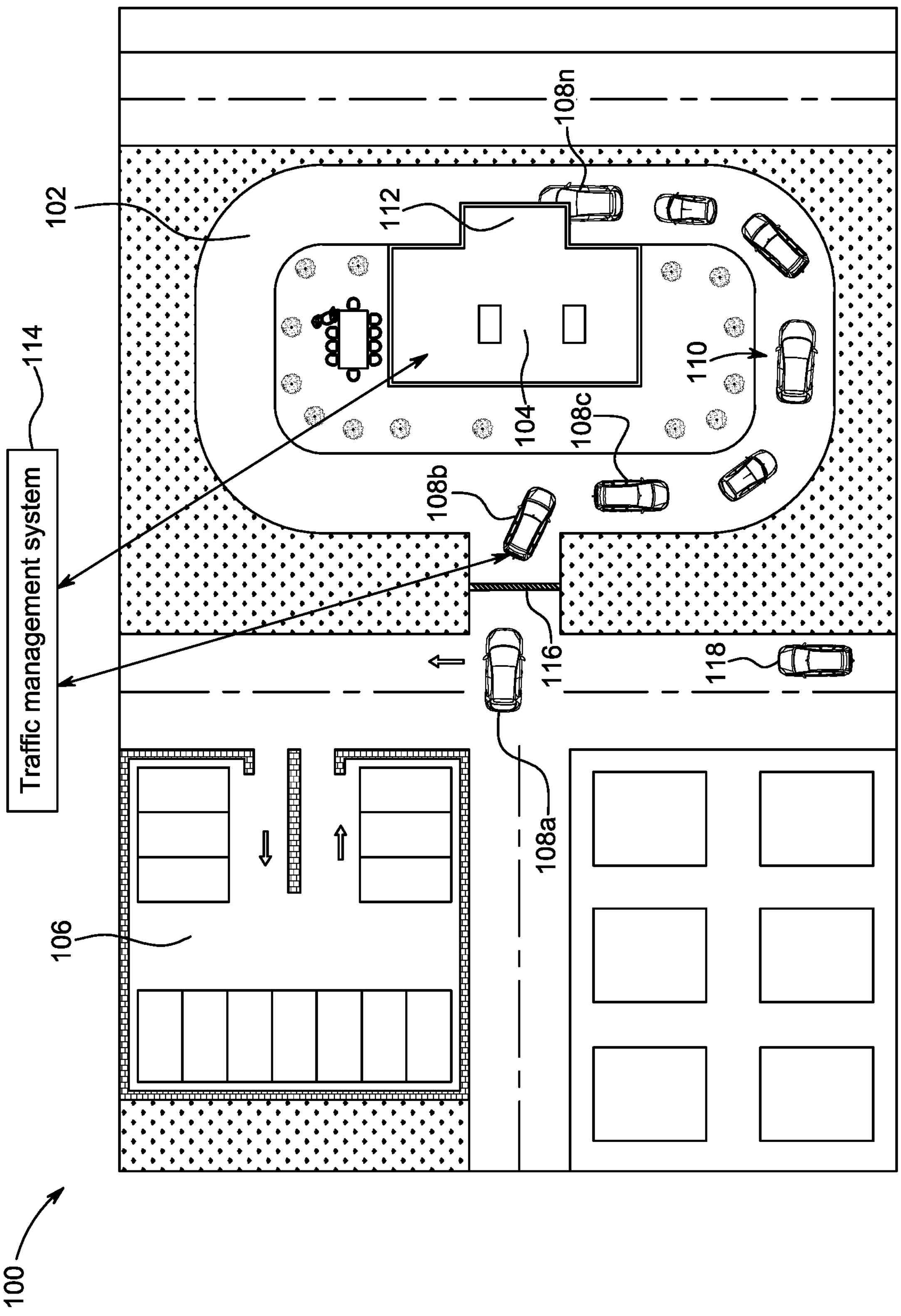
FIG. 1 depicts an example environment in which techniques and structures for providing the systems and methods disclosed herein may be implemented.

The present disclosure describes a traffic management system and method that prevents traffic build-up in proximity to locations of interest, e.g., near popular restaurants, drive-through of popular food chain stores, sports stadiums on match day, etc. The system may be communicatively coupled with sensors, cameras, etc. (e.g., a "sensor suite") associated with a plurality of vehicles in proximity to the location of interest and/or infrastructure associated with the location of interest. When the traffic may be expected to build-up in proximity to the location of interest (or when an operator "activates" the system), the system may determine a vehicle count in a vehicle queue in proximity to the location of interest and/or a vehicle queue length. Responsive to determining the vehicle count and the vehicle queue length, the system may compare the vehicle count with a permissible vehicle count (e.g., a threshold) and the vehicle queue length with a permissible vehicle queue length (e.g., a threshold). The system may determine that the traffic may have built-up in proximity to the location of interest and hence remedial actions may be required, when the vehicle count may be greater than the permissible vehicle count and/or the vehicle queue length may be greater than the permissible vehicle queue length.

In some aspects, as part of the remedial action, the system may identify one or more vehicles (e.g., a first vehicle) that may be present behind a point of interest in the vehicle queue. The point of interest may be a point in the vehicle queue where the vehicle count increases above the permissible vehicle count or a point in the vehicle queue wherein the vehicle queue length increases above the permissible vehicle queue length. Responsive to determining a first vehicle presence behind the point of interest in the vehicle queue, the system may transmit an instruction to the first vehicle to move away from the vehicle queue (or not join the vehicle queue) and move to a vacant space (e.g., a vacant parking space) in a geographical area including the location of interest. For example, the system may instruct the first vehicle to move to a parking lot that may be located 500 meters away from the location of interest. Responsive to receiving the instruction from the system, the first vehicle may move to the parking space.

The system may be further configured to obtain a service order from the first vehicle when the first vehicle may be located at the vehicle queue, moving towards the parking space, or located at the parking space. As an example, if the location of interest is a food chain store, the service order may be a food order associated with one or more food items that a first vehicle user may be interested in obtaining from the food chain store. Responsive to obtaining the food order from the first vehicle, the system may determine an approximate waiting time for the first vehicle to get the food order, based on the vehicle count in the vehicle queue, the vehicle queue length, a type of food item ordered by the first vehicle, estimated food preparation time duration required by the food chain store, and/or the like. The system may determine and recommend an optimum time for the first vehicle to join (or return to) the vehicle queue based on the determined waiting time. In some aspects, the optimum time may additionally be based on an estimated travel time duration required by the first vehicle to travel from a real-time vehicle location (e.g., the parking space) to the vehicle queue.

The system may be additionally configured to identify one or more other food chain stores for the first vehicle if the waiting time described above is greater than a predefined threshold. The system may further be configured to enable an optimum vehicle alignment for one or more vehicles (e.g., a second vehicle) at the parking space (or in the vehicle queue) such that the vehicles whose orders may be ready first may be stationed in front of the queue or ahead of other vehicles at the parking space. For example, if the food order associated with the second vehicle may be ready first, the second vehicle may be stationed ahead of the first vehicle in the vehicle queue or the parking space. Furthermore, the system may be configured to transmit alert notifications indicating a presence of the vehicle queue to one or more vehicles that may be traveling in proximity to the location of interest, so that the vehicles may adjust their respective lanes if they do not plan to join the vehicle queue.

The present disclosure discloses a traffic management system and method that prevents traffic build-up in proximity to the locations of interest. The system routes the vehicles to nearby available vacant spaces so that the traffic does not build up, thereby significantly enhancing convenience of commuters travelling in proximity to the locations of interest. The system further determines an optimum time for the vehicles to return to the location of interest (e.g., to the vehicle queue at the location of interest) from the respective vacant spaces, when the location of interest may be able to service the vehicles. The system may additionally transmit alert notifications indicating the presence of the vehicle queue to the vehicles that may be travelling in proximity to the locations of interest, so that the vehicles may timely change their lanes if they do not plan to join the vehicle queue (and hence prevent the traffic from building-up).

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a geographical area 102 including a plurality of locations, e.g., a location of interest 104, a parking space 106, and/or the like. The location of interest 104 may be any popular place in the geographical area 102 where a plurality of users may visit during different times of the day, week, month, etc. For example, the location of interest 104 may be a popular restaurant, a popular food chain store, sports or concert arena/stadium, and/or the like. For the description in the present disclosure, the location of interest 104 is considered to be a popular food chain store configured to prepare and deliver food items for the plurality of users, although the present disclosure is not limited to such an aspect. Further, hereinafter, the location of interest 104 is referred to as a first location 104.

The parking space 106 may be any space in the geographical area 102 that may be located within a predefined distance of the first location 104 (e.g., within 100-750 meters of the first location 104) and that may have vacant or unoccupied space where one or more vehicles may be parked. Even though FIG. 1 depicts a single parking space 106, the geographical area 102 may include more than one such parking space, without departing from the present disclosure scope. Hereinafter, the parking space 106 is referred to as a second location 106 in the present disclosure.

The environment 100 may further include a plurality of vehicles 108*a*, 108*b*, 108*c*, 108*n* (collectively referred to as vehicles 108) that may be located in proximity to the first location 104. Each vehicle 108 may take the form of any passenger or commercial vehicle such as, for example, a car, a work vehicle, a crossover vehicle, a truck, a van, a minivan, a taxi, a bus, etc. Further, the vehicle 108 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

In some aspects, the vehicles 108 may be associated with the plurality of users who may be customers of the food chain store/the first location 104 and who may be waiting for their respective food orders. In the exemplary aspect depicted in FIG. 1, the vehicles 108 form a vehicle queue 110 at a drive-through associated with the first location 104. The users/occupants present in the vehicles 108 may place their respective orders when their vehicles may be approaching the vehicle queue 110 or when the vehicles may be located in the vehicle queue 110 at a designated food ordering location. The users may pick their orders one-by-one at a food pick-up spot 112 at the first location 104, when their respective orders are ready. As shown in FIG. 1, the vehicle 108*a* may be located farthest from the first location 104 or approaching the vehicle queue 110 from the queue's end point, and the vehicle 108*n* may be located at the food pick-up spot 112.

The environment 100 may further include a traffic management system 114 (or system 114) that may be communicatively coupled with the vehicles 108 (e.g., sensors, cameras, vehicle computing systems, etc. associated with the vehicles 108) and the first location 104 or infrastructure associated with the first location 104 (e.g., sensors, cameras, computing systems associated with the first location 104 or located in proximity to the first location 104). The system 114 may further be communicatively coupled with the sensors, cameras, etc. associated with the second location 106. In some aspects, the system 114 may be hosted on a server (not shown). In other aspects, the system 114 may be hosted on one or more computing systems associated with the first location 104.

The system 114 may be configured to prevent traffic build-up in proximity to the first location 104. Specifically, the system 114 may be configured to manage the traffic/vehicle movement in proximity to the first location 104 such that the vehicle queue 110 does not become too long that it begins to affect regular traffic or vehicle movement (e.g., vehicles not associated with the first location customers) on one or more roads located adjacent to or in proximity to the first location 104. The system 114 may manage the traffic in proximity to the first location 104 by managing the vehicle queue length and ensuring that a count of vehicles in the vehicle queue 110 does not increase beyond a predefined threshold, as described below.

In some aspects, the system 114 may be configured to determine a vehicle queue length and/or a count of vehicles in the vehicle queue 110 based on inputs that the system 114 obtains from the sensors, cameras, etc. (collectively referred to as a sensor suite, shown as sensor suite 204 in FIG. 2) associated with the vehicles 108 and the first location 104. In an exemplary aspect, the system 114 may be configured to obtain the inputs from the sensor suite within a predefined time duration (e.g., within a predefined start time and a predefined end time) and/or when an operator associated with the first location 104 "activates" the system 114 or enables the system 114 to obtain the inputs from the sensor suite. As an example, the system 114 may be configured to obtain the inputs from the sensor suite on each day between 8-10 AM and between 4-8 PM, when the traffic at the first location 104 may be expected to be high. In other aspects, the system 114 may be configured to obtain the inputs from the sensor suite at all times throughout the day. In additional aspects, the system 114 may be configured to obtain the inputs from the sensor suite when the vehicle queue may be building up. In some aspects, the determine if a vehicle queue may be forming or building up, the system 114 may use route navigation to look for high density clusters of vehicles in any single location around the entrance of the first location 104 (e.g., an event or a restaurant), i.e., track traffic disturbances.

Responsive to determining the vehicle queue length and/or the count of vehicles in the vehicle queue 110 based on the obtained inputs, the system 114 may compare the determined vehicle queue length with a permissible vehicle queue length and/or the determined count of vehicles with a permissible vehicle count. The system 114 may further identify a point of interest 116 in the vehicle queue 110 based on the permissible vehicle queue length and/or the permissible vehicle count. In an exemplary aspect, the point of interest 116 may be a point in the vehicle queue 110 at which the vehicle queue length exceeds the permissible vehicle queue length or a point in the vehicle queue 110 at which the count of vehicles exceeds the permissible vehicle count.

Responsive to comparing the vehicle queue length with the permissible vehicle queue length and/or the count of vehicles with the permissible vehicle count, the system 114 may determine that the vehicle queue length may be greater than the permissible vehicle queue length and/or the count of vehicles may be greater than the permissible vehicle count. Stated another way, responsive to the comparison described above, the system 114 may determine that one or more vehicles (e.g., the vehicle 108*a*) may be present behind or beyond the point of interest 116 in the vehicle queue 110 (or approaching the point of interest 116), as shown in FIG. 1. Responsive to determining the presence of the vehicle 108*a* behind the point of interest 116, the system 114 may instruct the vehicle 108*a* to leave the vehicle queue 110 or not join the vehicle queue 110. Specifically, in this case, the system 114 may instruct (or transmit a first instruction to) the vehicle 108*a* to move from the vehicle queue 110 to the second location 106.

In some aspects, the system 114 may transmit the first instruction to the vehicle 108*a* or to a user device (not shown) of a user associated with the vehicle 108*a*, by using vehicle-to-vehicle (V2V) communication or vehicle-to-infrastructure (V2I) communication. Responsive to receiving the first instruction from the system 114, the user may drive the vehicle 108*a* from the vehicle queue 110 to the second location 106 or the vehicle 108*a* may itself move from the vehicle queue 110 to the second location 106 (e.g., when the vehicle 108*a* is an autonomous vehicle). Since the second location 106 may have available parking space (as described above), the vehicle 108*a* may conveniently be parked at the second location 106 and wait for its turn to return to the vehicle queue 110. In this manner, the system 114 ensures that the vehicles behind the point of interest 116 are moved to different parking or "available" locations in the geographical area 102, and the vehicle queue 110 does not extend beyond its permissible length or does not include more vehicles than the permissible vehicle count. By ensuring that the vehicle queue 110 stays within the permissible vehicle queue length, the system 114 ensures that other commuters driving in proximity to the first location 104 are not affected and regular traffic may move in the geographical area 102 without any traffic jams.

The system 114 may be further configured to obtain a service order (e.g., a food order) from the vehicle 108*a* or the user device associated with the user of the vehicle 108, when the vehicle 108*a* may be located at the vehicle queue 110, moving towards the second location 106, or located at the second location 106. The system 114 may further transmit the service order to the first location 104, and receive an estimated time duration required by the first location 104 to prepare the service order/food and provide the food to the vehicle 108*a* (specifically to the user associated with the vehicle 108*a*).

Responsive to receiving the estimated time duration required by the first location 104 to provide the food to the vehicle 108*a*, the system 114 may determine an estimated vehicle travel time duration required by the vehicle 108*a* to travel from the second location 106 to the vehicle queue 110. In some aspects, the system 114 may determine the estimated vehicle travel time duration based on inputs (e.g., an average vehicle speed) received from the sensors associated with the vehicle 108*a* and/or the inputs (e.g., traffic condition information in the geographical area 102) received from the sensors/cameras associated with the first and second locations 104, 106 (or from an external server, shown as server 202 in FIG. 2).

The system 114 may further determine an optimum time for the vehicle 108*a* to return to the vehicle queue 110 (e.g., from the second location 106) or commence vehicle journey from the second location 106 to the vehicle queue 110, based on the estimated vehicle travel time duration required by the vehicle 108*a* to travel from the second location 106 to the vehicle queue 110 and/or the estimated time duration required by the first location 104 to provide the food to the vehicle 108*a*. The system 114 may determine the optimum time such that when the vehicle 108*a* returns and joins the vehicle queue 110, the vehicle 108*a* may enter at a point in the vehicle queue 110 that may be ahead of or at the point of interest 116. In this manner, the vehicle 108*a* may not be located beyond or behind the point of interest 116 (and hence not causing any traffic jams), when the vehicle 108*a* returns and joins the vehicle queue 110.

The system 114 may instruct (or transmit a second instruction to) the vehicle 108*a* to move from the second location 106 to the vehicle queue 110 at the optimum time. Responsive to receiving the second instruction, the vehicle 108*a* may move towards and join the vehicle queue 110.

Although the description above describes an aspect where the system 114 instructs the vehicle 108*a* to move towards the second location 106 when the vehicle 108*a* may be located beyond or behind the point of interest 116, in some aspects, the system 114 may simply request the vehicle 108*a* to return to the vehicle queue 110 at the determined optimum time and may not instruct the vehicle 108*a* to move to the second location 106. In this case, the vehicle 108*a* may move in the geographical area 102 (e.g., take rounds around the first location 104), and may return to the vehicle queue 110 on its own at the optimum time.

Furthermore, the system 114 may be additionally configured to ensure that one or more vehicles (including the vehicle 108*a*) that may be located at the second location 106 (e.g., when the vehicle 108*a* moves to the second location 106) are aligned or stationed in a queue in the second location 106 based on their respective expected order of deliveries from the first location 104. For example, if another vehicle is already present in the second location 106 when the vehicle 108*a* reaches the second location 106, the system 114 may determine the expected order of deliveries associated with the vehicle 108*a* and the other vehicle from the first location 104. Thereafter, the system 114 may transmit a vehicle alignment notification to the vehicle 108*a* and the other vehicle instructing the vehicles to align based on their expected order of deliveries. For example, if the food order associated with the other vehicle is expected to be ready first, then the other vehicle may be instructed to be stationed ahead of the vehicle 108*a* in the queue at the second location 106 (or vice versa). Such a vehicle alignment in the second location 106 ensures that the traffic movement from the second location 106 to the vehicle queue

110 is smooth, and the vehicles leaving the second location 106 early have their food orders ready early.

In some aspects, the system 114 may additionally request the other vehicle to fetch the service order associated with the vehicle 108*a* (or vice-versa) from the first location 104 and return to the second location 106, thereby eliminating the need for the vehicle 108*a* to travel to the first location 104 to obtain the service order. This may further facilitate to prevent vehicle queue build-up in proximity to the first location 104.

In further aspects, the system 114 may be configured to identify another food store (or another service provider) for the vehicle 108*a* in the geographical area 102 (or in other geographical areas), when the system 114 determines that the estimated time duration required by the first location 104 to provide the food to the vehicle 108*a* may be greater than a predefined time duration threshold or when the first location 104 may not be able to prepare the food ordered by the vehicle 108*a*. For example, the system 114 may identify another food store (not shown) for the vehicle 108*a* in the geographical area 102 when the waiting period to obtain the food at the first location 104 may be too long for the vehicle 108*a*. Responsive to identifying the other food store, the system 114 may transmit an instruction (e.g., a third instruction) to the vehicle 108*a* to move to the other food store. The system 114 may additionally identify a real-time vehicle location (e.g., based on the inputs obtained from the sensor suite), and may transmit navigation instructions to the vehicle 108*a* to enable the vehicle movement from the real-time vehicle location to a location associated with the other food store.

In additional aspects, the system 114 may be configured to determine a presence of a vehicle 118 in proximity to the vehicle queue 110 or on a road in proximity to the vehicle queue 110, based on the inputs obtained from the sensor suite. In some aspects, the vehicle 118 may or may not be expected/estimated to join the vehicle queue 110. Responsive to determining the presence of the vehicle 118, the system 114 may transmit an alert notification to the vehicle 118. The alert notification may indicate to the vehicle 118 that the vehicle queue 110 may be present in proximity to the vehicle 118 or on the road on which the vehicle 118 may be travelling. If the vehicle 118 is not planning to join the vehicle queue 110, the vehicle 118 may change lanes and hence minimize a probability of traffic build-up in proximity to the vehicle queue 110.

Further system details are described below in conjunction with FIG. 2.

The vehicles 108 and the system 114 implement and/or perform operations, as described here in the present disclosure, in accordance with the owner manual and safety guidelines. In addition, any action taken by the users associated with the vehicles 108 based on the notifications provided by the vehicles 108 and/or the system 114 should comply with all the rules specific to the location and operation of the vehicles 108 (e.g., Federal, state, country, city, etc.). The notifications, as provided by the vehicles 108 and/or the system 114 should be treated as suggestions and only followed according to any rules specific to the location and operation of the vehicles 108.

Figure 2:
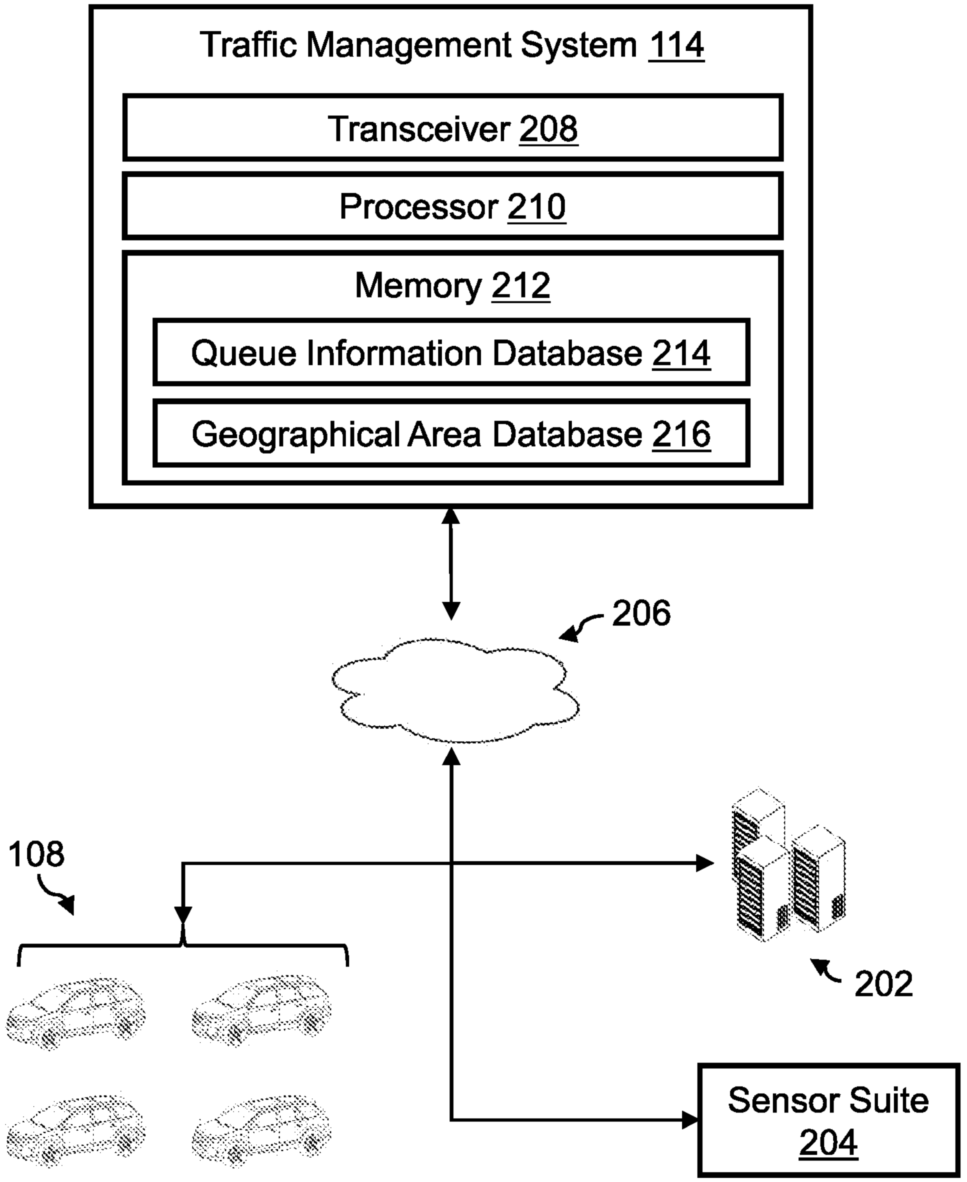
FIG. 2 depicts a block diagram of a traffic management system in accordance with the present disclosure.

FIG. 2 depicts a block diagram of the traffic management system 114 (or system 114) in accordance with the present disclosure. While describing FIG. 2, references will be made to FIGS. 3-5.

The system 114 may be communicatively coupled with the vehicles 108, one or more servers 202 (or server 202), a sensor suite 204, computing systems (not shown) associated with the first location 104 via one or more networks 206 (or network 206). The server 202 may be part of a cloud-based computing infrastructure and may be associated with and/or include a Telematics Service Delivery Network (SDN) that provides digital data services to the vehicles 108 and/or the system 114. In further aspects, the server 202 may be configured to store information associated with the geographical area 102, and transmit the information to the system 114 for storage purpose. The information associated with the geographical area 102 may include, for example, geolocations associated with the first and second locations 104, 106, a digital map associated with the geographical area 102, and/or the like. In additional aspects, the server 202 may be associated with a navigation service provider, and may be configured to determine and transmit real-time traffic information in the geographical area 102 and navigation instructions between any two locations in the geographical area 102 (e.g., between a source location and a destination location) to the system 114. In some aspects, the server 202 may transmit the information associated with the geographical area 102, the real-time traffic information and the navigation instructions to the system 114 when the system 114 transmits a request to the server 202 to obtain the information.

As described above in conjunction with FIG. 1, the sensor suite 204 may include sensors, cameras, etc. associated with the vehicles 108, the first location 104 and/or the infrastructure in proximity to the first location 104. The sensor suite 204 may additionally include the sensors, cameras, etc. associated with the second location 106. In some aspects, the system 114 may be communicatively coupled with the sensor suite 204 via V2V communication, V2I communication, and/or via the network 206.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The system 114 may include a plurality of units including, but not limited to, a transceiver 208, a processor 210 and a memory 212. The transceiver 208 may be configured to transmit/receive information/data to/from external systems and devices via the network 206. For example, the transceiver 208 may be configured to receive inputs from the sensor suite 204 and transmit information/notifications to the vehicles 108, the computing systems associated with the first location 104, and/or the like.

The processor 210 may be disposed in communication with one or more memory devices disposed in communication with the respective computing systems (e.g., the memory 212 and/or one or more external databases not shown in FIG. 2). The processor 210 may utilize the memory 212 to store programs in code and/or to store data for performing aspects in accordance with the disclosure. The memory 212 may be a non-transitory computer-readable storage medium or memory storing a program code that enables the processor 210 to perform operations in accordance with the present disclosure. The memory 212 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 212 may include a plurality of databases including, but not limited to, a queue information database 214 and a geographical area database 216. The queue information database 214 may be configured to store information associated with the permissible vehicle queue length and the permissible vehicle count associated with the vehicle queue 110, as described above in conjunction with FIG. 1. The queue information database 214 may obtain the information from an operator associated with the first location 104. The geographical area database 216 may store the information associated with the geographical area 102 that the system 114 may obtain from the server 202.

In operation, the transceiver 208 may receive the inputs (e.g., images captured from the cameras, sensor inputs, etc.) from the sensor suite 204 via V2V communication, V2I communication and/or the network 206. As described above in conjunction with FIG. 1, the transceiver 208 may receive the inputs (or "sensor inputs") from the sensor suite 204 at a preset start time or when the operator associated with the first location 104 "activates" the system 114. In other aspects, the transceiver 208 may receive the sensor inputs at all times throughout the day. In yet another aspect, the transceiver 208 may receive the sensor inputs when the vehicle queue may be building up. In some aspects, the determine if a vehicle queue may be forming or building up, the system 114 may use route navigation to look for high density clusters of vehicles in any single location around the entrance of the first location 104 (e.g., an event or a restaurant), i.e., track traffic disturbances.

Responsive to the transceiver 208 receiving the sensor inputs, the processor 210 may obtain the sensor inputs from the transceiver 208. The processor 210 may then determine a vehicle count in the vehicle queue 110 and/or a vehicle queue length associated with the vehicle queue 110 based on the sensor inputs. Responsive to determining the vehicle count and the vehicle queue length, the processor 210 may fetch the information associated with the permissible vehicle queue length and the permissible vehicle count associated with the vehicle queue 110 from the queue information database 214. The processor 210 may then compare the vehicle count with the permissible vehicle count and the vehicle queue length with the permissible vehicle queue length.

The processor 210 may determine that a predefined condition may be met when the vehicle count may be greater than the permissible vehicle count and/or the vehicle queue length may be greater than the permissible vehicle queue length. Responsive to determining that the predefined condition may be met, the processor 210 may identify/determine a presence of one or more vehicles (e.g., the vehicle **108*a*) that may be located behind or beyond the point of interest 116 in the vehicle queue 110 based on the sensor inputs. The concept of the point of interest 116 is already described above in conjunction with FIG. 1. In some aspects, the processor 210 may identify the point of interest 116 in the vehicle queue 110 based on the sensor inputs and the information associated with the permissible vehicle queue length and the permissible vehicle count obtained from the queue information database 214**.

Figure 3:
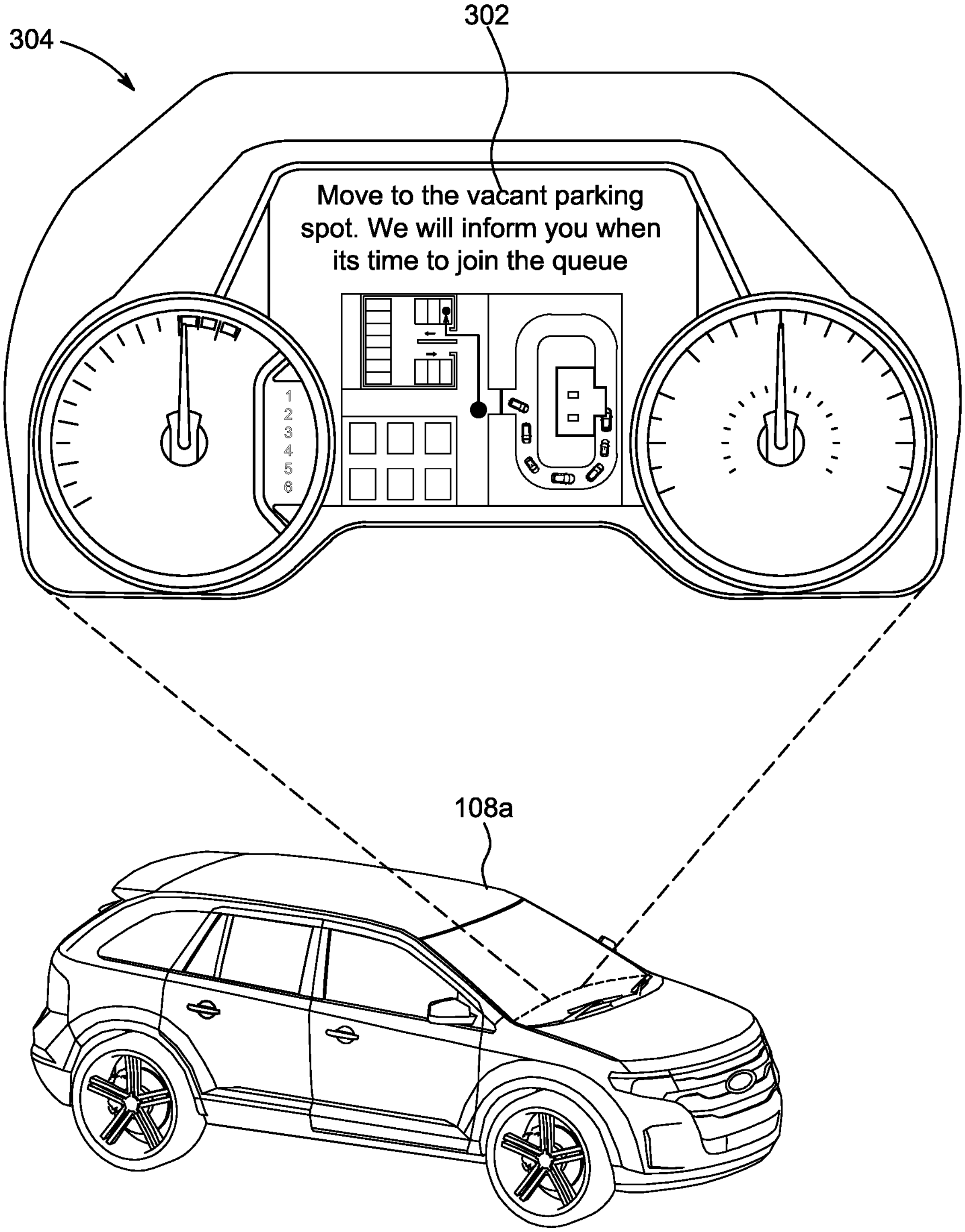
FIG. 3 depicts an example snapshot of a vehicle Human-Machine Interface (HMI) displaying a first notification in accordance with the present disclosure.

Responsive to determining that the vehicle **108*a* may be present behind the point of interest 116 or may be approaching the point of interest 116, the processor 210 may transmit, via the transceiver 208, a first instruction to the vehicle 108*a* or a user device (not shown) associated with the user of the vehicle 108*a*, requesting the vehicle 108*a* to move to the second location 106, as described above in conjunction with FIG. 1. As an example, the processor 210 may transmit an instruction 302 stating, "Move to the vacant parking spot. We will inform you when it is time to join the queue", to the vehicle 108*a*, which may be displayed on a vehicle Human-Machine Interface 304, as shown in FIG. 3. The vehicle user may view the instruction 302 and may then accordingly move from the vehicle queue 110 to the second location 106. In some aspects, the processor 210 may be further configured to obtain a real-time vehicle location based on the sensor inputs, and may transmit first navigation instructions to the vehicle 108*a* to enable the vehicle movement from the real-time vehicle location to the second location 106. The processor 210 may obtain the first navigation instructions from the server 202, and the navigation instructions may include turn-by-turn instructions that may facilitate the vehicle user to conveniently drive the vehicle 108*a* from the vehicle queue 110 to the second location 106. In alternative aspects, if the vehicle 108*a* is an autonomous vehicle, the vehicle 108*a* may automatically move towards the second location 106 responsive to receiving the first instruction from the processor 210. In an exemplary aspect, discounts may be provided to the vehicle user for shops, establishments, etc. in proximity to the second location 106, to incentivize the vehicle user to move to the second location 106**.

As described above in conjunction with FIG. 1, the processor 210 may be configured to obtain a service order or a food order from the vehicle **108*a* or the user device associated with the vehicle user, when the vehicle 108*a* may be located at the vehicle queue 110, moving towards the second location 106 or located at the second location 106. The processor 210 may further transmit the food order to the first location 104, and obtain an estimated time duration required by the first location 104 to provide the food to the vehicle 108*a* based on the food order and a count of orders already placed at the first location 104 prior to receiving the food order from the processor 210. In some aspects, the processor 210 and/or the first location 104 may also determine the estimated time duration based on the vehicle queue length and the vehicle count in the vehicle queue 110**.

The processor 210 may determine an optimum time for the vehicle **108*a* to join the vehicle queue 110 based on the estimated time duration described above. The processor 210 may further transmit the optimum time to the vehicle 108*a*, and request the vehicle 108*a* to return to the vehicle queue 110 at the optimum time. If the vehicle 108*a* is at the vehicle queue 110 (or approaching the vehicle queue 110) when the processor 210 transmits the optimum time to the vehicle 108*a*, the vehicle 108*a* may take rounds around the first location 104 and return to the vehicle queue 110** on its own at the optimum time.

On the other hand, when the vehicle **108*a* is at the second location 106 (or moving towards the second location 106) when the processor 210 receives the food order from the vehicle 108*a*, the processor 210 may determine the optimum time based on the estimated time duration described above and an estimated vehicle travel time duration that the vehicle 108*a* may require to travel from the second location 106 to the vehicle queue 110. In some aspects, the processor 210 may determine the estimated vehicle travel time duration based on the sensor inputs (e.g., an average vehicle travel speed obtained from the vehicle sensors) and the real-time traffic condition information obtained from the server 202**.

In additional aspects, while determining the optimum time, the processor 210 may add a preset buffer time duration (e.g., of 3-8 minutes) to the time durations described above, so that if the vehicle 108*a* enters the vehicle queue 110 too early or too late, the processor 210 may request the vehicle 108*a* to come back later or get dropped from the vehicle queue 110.

Responsive to determining the optimum time as described above, the processor 210 may transmit, via the transceiver 208, a second instruction to the vehicle 108*a* to move from the second location 106 to the vehicle queue 110 at the optimum time. In some aspects, the second instruction may include second navigation instructions (including turn-by-turn instructions, distance, etc.) that may enable the vehicle movement from the second location 106 to the vehicle queue 110. The vehicle user may view/hear the second instruction, and may accordingly move the vehicle 108*a* from the second location 106 to the vehicle queue 110 at the optimum time. If the vehicle 108*a* is an autonomous vehicle, the vehicle 108*a* may automatically move to the vehicle queue 110 at the optimum time responsive to receiving the second instruction.

In alternative aspects, the vehicle user may also transmit (via the vehicle 108*a* or the user device) a request to the processor 210 to enter the vehicle queue 110 early, if the vehicle user desires to join the vehicle queue 110 early. In this case, based on the real-time vehicle queue length and/or the vehicle count in the vehicle queue 110, the processor 210 may or may not allow the vehicle 108*a* to join the vehicle queue 110 early. For example, if the projected waiting time duration at the vehicle queue 110 is equal to (or slightly greater than) the time duration it would require for the vehicle 108*a* to reach to the vehicle queue 110 from the vehicle's real-time location, the processor 210 may allow the vehicle 108*a* to join the vehicle queue 110 early.

When the vehicle 108*a* reaches the vehicle queue 110 (or is located in proximity to the vehicle queue 110), the processor 210 may assign a unique identifier to the vehicle 108*a* (e.g., based on a vehicle's identification number, a license plate number, or vehicle's food order unique identifier) and made to enter or be stationed at the vehicle queue 110 in chronological order, so that no vehicle may cut the vehicle queue 110. In some aspects, the processor 210 may assign a unique identifier in chronological order to each vehicle in the vehicle queue 110, which may be associated with a vehicle's identification number. If any vehicle cuts the line/queue, as determined via the vehicle's unique identifier, the processor 210 may instruct the vehicle to leave the vehicle queue 110, not accept the vehicle's food order, and/or instruct the first location 104 to not deliver the food order to the vehicle.

Figure 4:
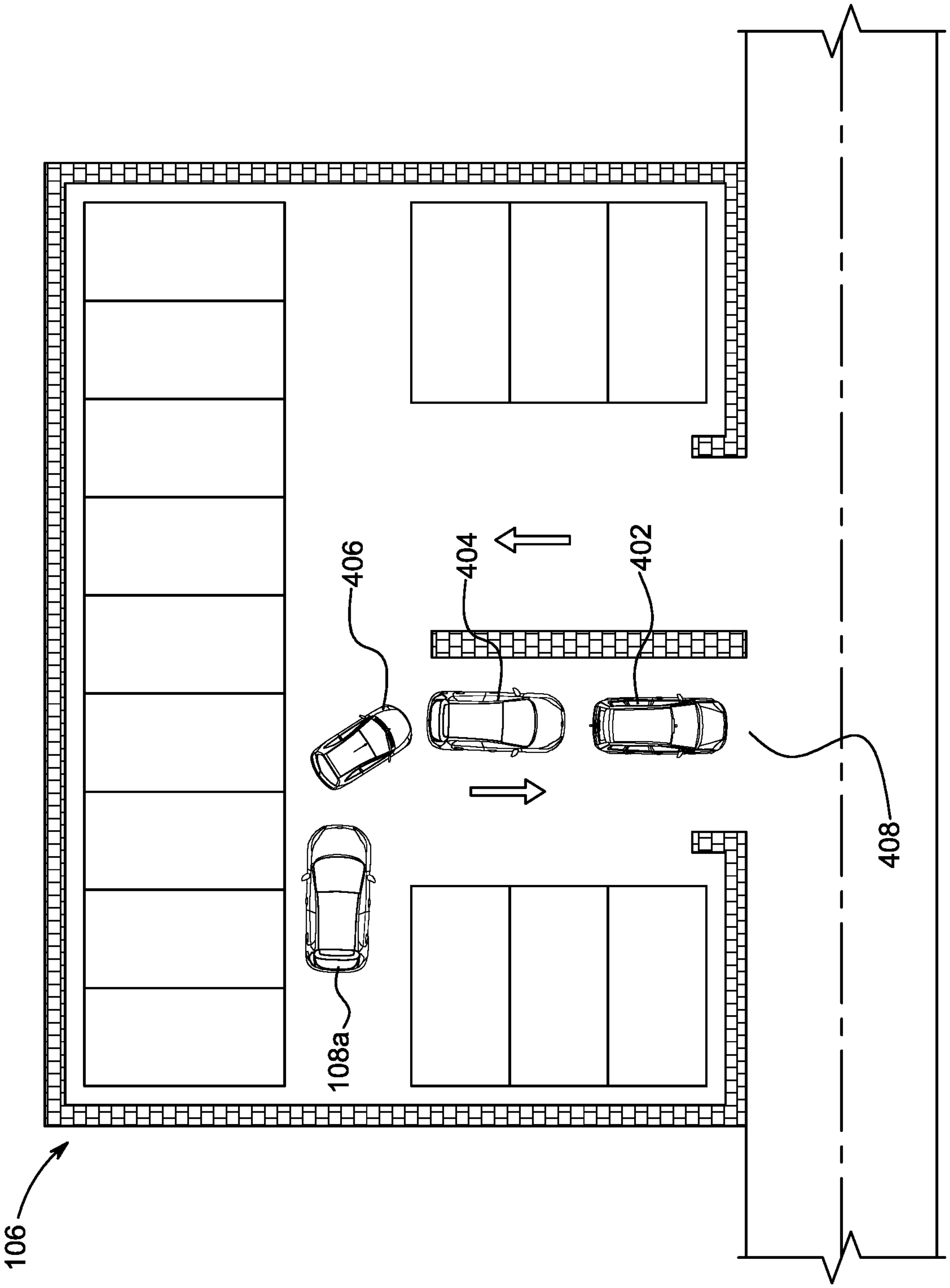
FIG. 4 depicts a snapshot of an example parking space in accordance with the present disclosure.

In addition to enabling the vehicle movement to and from the second location 106 and the vehicle queue 110 as described above, the processor 210 may provide further assistance to the vehicles 108. For example, in some aspects, when the vehicle 108*a* may be moving towards the second location 106 or located at the second location 106, the processor 210 may determine that one or more additional vehicles may already be present at the second location 106 based on the sensor inputs obtained from sensors, cameras, etc. located at or in proximity to the second location 106. For example, the processor 210 may determine that vehicles 402, 404, 406 may be present in the second location 106, as shown in FIG. 4. Responsive to determining that the vehicles 402, 404, 406 may be present in the second location 106, the processor 210 may obtain an order of food deliveries associated with the vehicles 402, 404, 406 and 108*a* from the first location 104. The processor 210 may further transmit a vehicle alignment notification to the vehicles 402, 404, 406 and 108*a* based on the order of food deliveries. The vehicle alignment notification may include instructions to queue the vehicles 402, 404, 406 and 108*a* based on their respective order of deliveries. For example, if the food order for the vehicle 108*a* would be ready the last, the vehicle 108*a* may be stationed last in the queue at the second location 106. Similarly, if the food order for the vehicle 402 would be ready first, the vehicle 402 may be stationed closest to an exit 408 associated with the second location 106. By aligning the vehicles 402, 404, 406 and 108*a* in the manner described above, the vehicle movement from the second location 106 to the vehicle queue 110 and the food deliveries at the first location 104 may follow a smooth chorological order, and hence prevent any chances of traffic build-up in proximity to the first location 104.

In some aspects, the processor 210 may further transmit a request to any one vehicle from the vehicles 402, 404, 406 and 108*a* to fetch food deliveries for the other vehicles from the first location 104 and return to the second location 106, thereby eliminating the need for the other vehicles to travel to the first location 104 to obtain their respective food deliveries. This may further facilitate to prevent vehicle queue build-up in proximity to the first location 104.

A person ordinarily skilled in the art may appreciate that a similar process of aligning vehicles at the second location 106 may be implemented when the first location 104 may be associated with a sports or concert arena. In this case, the order of vehicle alignment in the second location 106 may be based on the allocated sitting areas in the arena for the users associated with the vehicles 402, 404, 406 and 108*a*.

Figure 5:
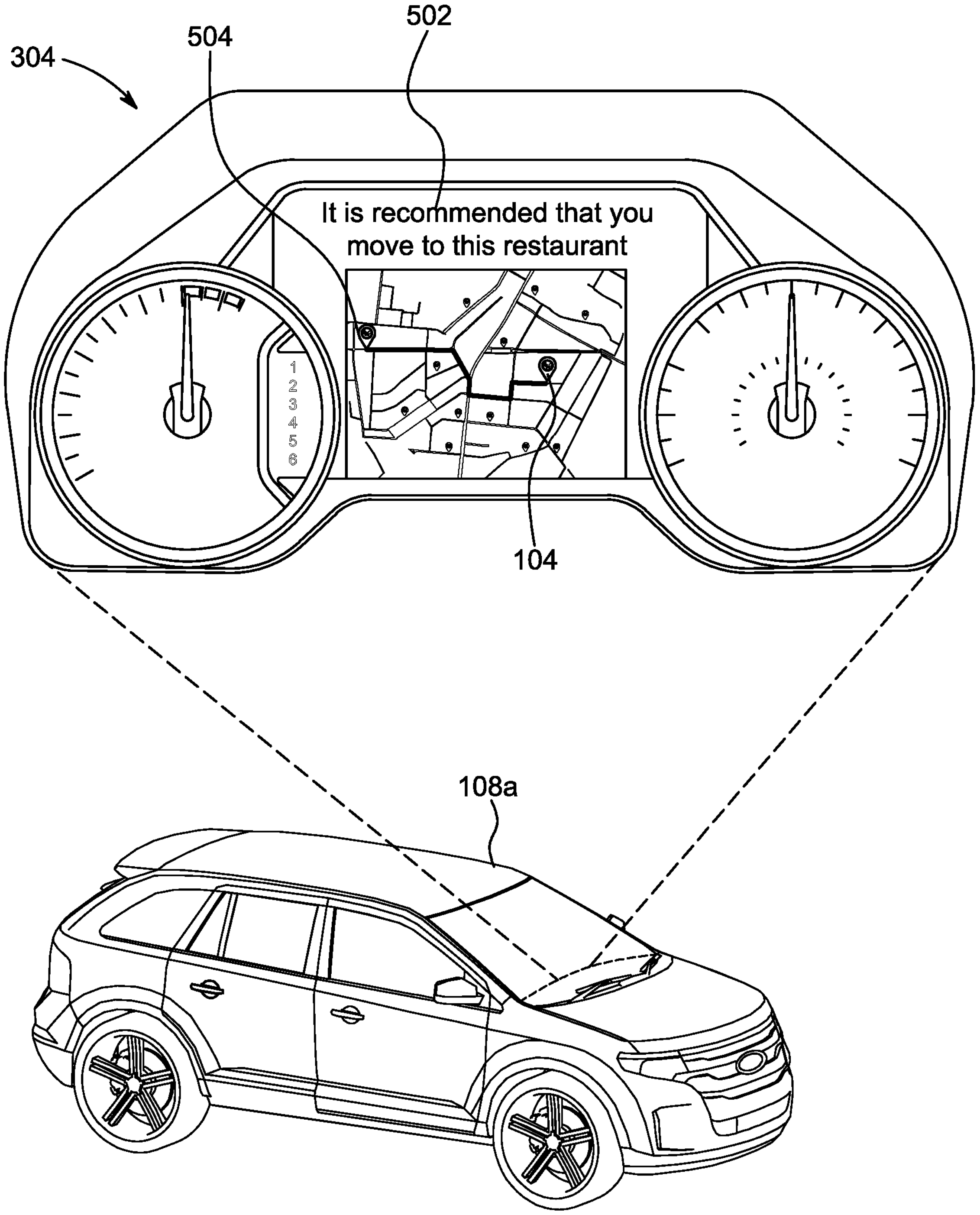
FIG. 5 depicts an example snapshot of a vehicle Human-Machine Interface (HMI) displaying a second notification in accordance with the present disclosure.

As another example, the processor 210 may be configured to identify other food chain stores in the geographical area 102 (or other geographical areas) for the vehicle 108*a* if the first location 104 is unable to service the vehicle 108*a*. In this case, if the processor 210 determines that the estimated time duration required by the first location 104 to provide the food to the vehicle 108*a* is greater than a predefined time duration (e.g., the waiting time is too long) or if the first location 104 is unable to prepare the food order requested by the vehicle 108*a*, the processor 210 may identify another service provider (e.g., located at a third location) that may have a shorter waiting time and recommend the vehicle 108*a* to move to the third location. In an exemplary aspect, in this case, the processor 210 may transmit a third instruction 502 to the vehicle 108*a* (to be displayed on the HMI 304) to move to a third location 504, as shown in FIG. 5. Responsive to receiving the third instruction 502, the HMI 304 may display the third instruction 502. The third instruction 502 may include location icons associated with the first location 104 and the third location 504, the distance between the first and third locations 104, 504, third navigation instructions to move to the third location 504, an example caption stating "It is recommended that you move to this restaurant.", and/or the like. In some aspects, discounts may be provided to the user associated with the vehicle 108*a* at the food store at the third location 504, to incentivize the user to move to the third location 504.

In some aspects, the processor 210 may determine the waiting time associated with the third location 504 based on inputs obtained from V2I and V2V communication, by tracking cellular activity associated with a plurality of users at the third location 504 by using Global Positioning System (GPS), activity status or a count of users present at the third location 504 determined based on inputs received from the server 202, and/or the like.

In an exemplary aspect, the processor 210 may determine the third location 504 such that a sum of an estimated time duration required by the other service provider at the third location 504 to provide the food to the vehicle 108*a* (i.e., the waiting time) and an estimated travel time duration required by the vehicle 108*a* to travel from the vehicle queue 110 to the third location 504 is less than the estimated time duration required by the first location 104 to provide the food to the vehicle 108*a*. Stated another way, the processor 210 may determine and recommend the third location 504 to the vehicle 108*a* when a sum of the estimated travel time duration and the reduced waiting time at the third location 504 is considerably less than the estimated time duration required by the first location 104 to provide the food to the vehicle 108*a* (i.e., when there is a substantial time-saving for the vehicle 108*a*).

In additional aspects, the processor 210 may determine the third location 504 based on expected travel route associated with the vehicle 108*a* and/or based on a level of activity at the third location 504. The processor 210 may determine and recommend the third location 504 to the vehicle 108*a* when the vehicle 108*a* may be approaching the vehicle queue 110 (so that the vehicle 108*a* may still pull out in time, if the vehicle queue 110 is long).

In further aspects, the processor 210 may obtain a user confirmation from the vehicle 108*a* or the user device associated with the vehicle user, responsive to transmitting the third instruction 502 to the vehicle 108*a*. The user confirmation may indicate to the processor 210 that the vehicle 108*a* (specifically the vehicle user) agrees to move to the third location 504. In some aspects, the processor 210 may transmit the third navigation instructions to the vehicle 108*a* to enable the vehicle movement from the vehicle queue 110 (or the real-time vehicle location) to the third location 504 when the processor 210 obtains the user confirmation from the vehicle user.

The processor 210 may be further configured to determine a presence of the vehicle 118 in proximity to the vehicle queue 110 or on a road in proximity to the vehicle queue 110, based on the sensor inputs, as described above in conjunction with FIG. 1. Responsive to determining the presence of the vehicle 118, the processor 210 may transmit, via the transceiver 208, the alert notification to the vehicle 118. The alert notification may indicate to the vehicle 118 that the vehicle queue 110 may be present in proximity to the vehicle 118 or on the road on which the vehicle 118 may be travelling. If the vehicle 118 is not planning to join the vehicle queue 110, the vehicle 118 may change lanes and hence minimize a probability of traffic build-up in proximity to the vehicle queue 110.

The system 114 may further implement alternative or additional methods to prevent traffic build-up in proximity to the first location 104. For example, the system 114 may enable one or more delivery vehicles to deliver the food orders from the first location 104 to the vehicles 402, 404, 406 and 108*a* located at the second location 106 (or any other location, e.g., an ice cream store), so that the vehicles 402, 404, 406 and 108*a* may not be required to enter the vehicle queue 110. Further, one or more vehicles, from the vehicles 108, which may be present at the vehicle queue 110 may be provided discounts or incentives to carry the food orders from the first location 104 to the vehicles 402, 404, 406 and 108*a* located at the second location 106. The food orders may be delivered in sealed packaging to prevent germ build-up. Furthermore, one or more vehicles from the vehicles 402, 404, 406 and 108*a* may be required to fetch the food orders for the other vehicles at the second location 106 (or any other location, e.g., an Electric Vehicle (EV) charging station), thereby eliminating the need for the other vehicles to join the vehicle queue 110. In addition, one or more vehicles may be requested to travel or take rounds around the first location 104, and join the vehicle queue 110 only when the waiting time is less.

Figure 6:
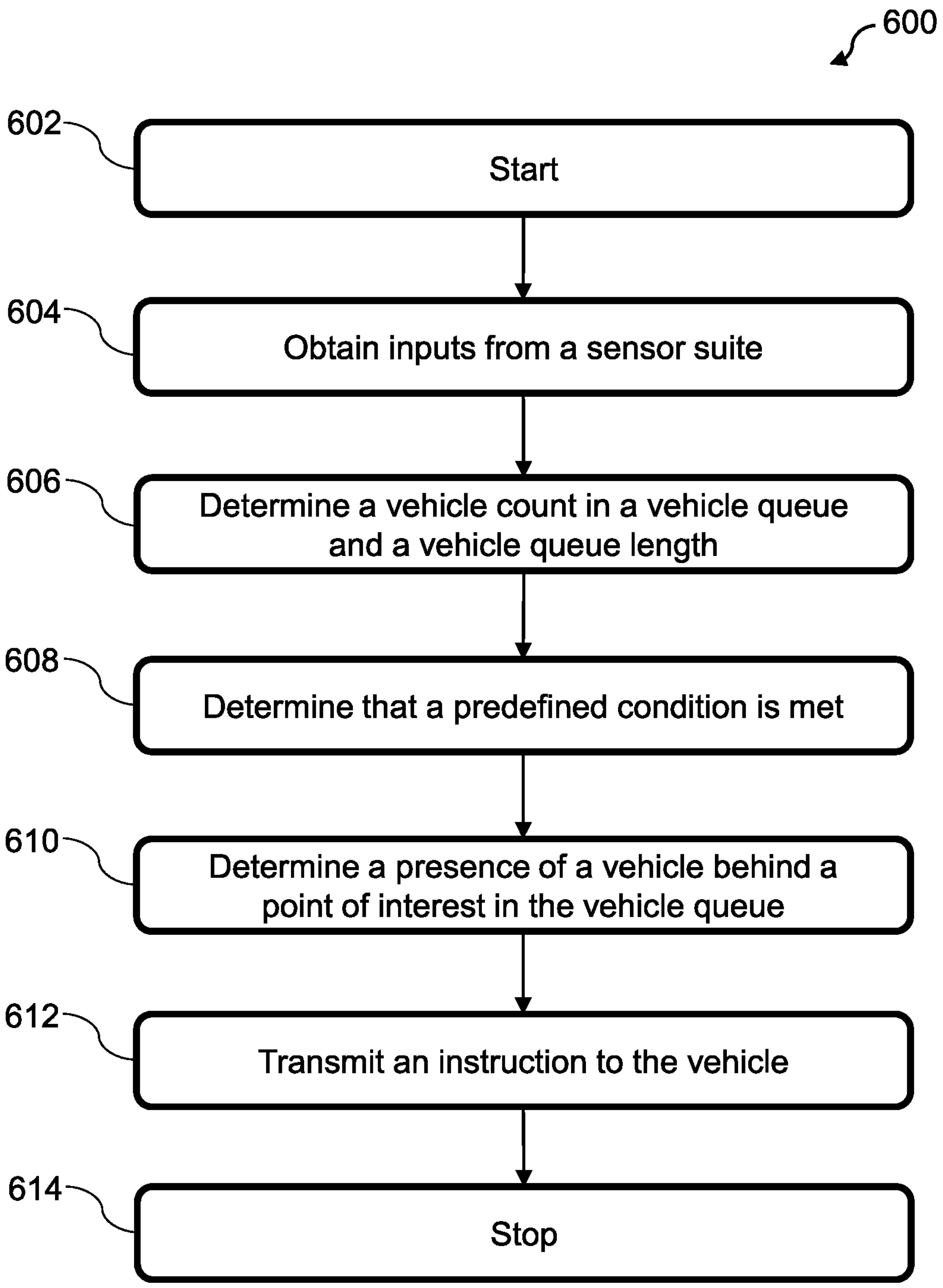
FIG. 6 depicts a flow diagram of an example traffic management method in accordance with the present disclosure.

FIG. 6 depicts a flow diagram of an example traffic management method 600 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 210, the sensor inputs from the sensor suite 204. At step 606, the method 600 may include determining, by the processor 210, the vehicle count in the vehicle queue 110 and the vehicle queue length based on the sensor inputs.

At step 608, the method 600 may include determining, by the processor 210, that the predefined condition may be met based on the vehicle count and the vehicle queue length. As described above, the predefined condition may be met when the vehicle count may be greater than the permissible vehicle count and/or the vehicle queue length may be greater than the permissible vehicle queue length. At step 610, the method 600 may include determining, by the processor 210, the presence of the vehicle 108*a* behind the point of interest 116 in the vehicle queue 110 based on the sensor inputs, responsive to determining that the predefined condition may be met.

At step 612, the method 600 may include transmitting, by the processor 210, the first instruction to the vehicle 108*a* to move to the second location 106, responsive to determining the presence of the vehicle 108*a*.

At step 614, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A traffic management system comprising:

a vehicle configured to receive data inputs from a sensor suite located in proximity to a first location; and a memory configured to store information associated with a first threshold vehicle queue length and a second threshold vehicle count;

a processor communicatively coupled with one or more sensors and the memory, wherein the processor is configured to:

obtain the data inputs from the one or more sensors;

obtain information from the memory;

determine at least one of a count of vehicles in a vehicle queue in proximity to the first location or a vehicle queue length based on the inputs;

determine that a predefined condition is met when the count of vehicles is greater than the first threshold vehicle count or the vehicle queue length is greater than the second threshold vehicle queue length;

identify the point of interest in the vehicle queue based on the information obtained from the memory and the data inputs obtained from the one or more sensors, wherein the point of interest comprises a point in the vehicle queue at which the vehicle queue length exceeds the threshold vehicle queue length or a point in the vehicle queue at which the count of vehicles exceeds the threshold vehicle count;

determine a presence of a first vehicle behind a point of interest in the vehicle queue based on the inputs, responsive to determining that the predefined condition is met;

transmit a first instruction to the first vehicle to move to a second location responsive to determining a first vehicle presence, wherein the first vehicle is an autonomous vehicle; and automatically move the first vehicle towards the second location responsive to receiving the first instruction.

2. The traffic management system of claim 1, wherein the sensor suite comprises at least one of sensors associated with a plurality of vehicles located in proximity to the first location, or sensors associated with infrastructure located in proximity to the first location.

3. The traffic management system of claim 1, wherein the transceiver is configured to receive the inputs from the sensor suite via vehicle-to-vehicle (V2V) communication or vehicle-to-infrastructure (V2I) communication.

4. The traffic management system of claim 1, wherein the processor obtains the inputs from the transceiver at a preset start time.

5. The traffic management system of claim 1, wherein the processor is further configured to:

determine a return time for the first vehicle to return to the vehicle queue, when the first vehicle moves to the second location responsive to receiving the first instruction from the processor; and transmit a second instruction to the first vehicle to move from the second location to the vehicle queue at the return time.

6. The traffic management system of claim 5, wherein the processor is further configured to determine a real-time first vehicle location based on the inputs obtained from the transceiver, wherein the first instruction comprises first navigation instructions to enable a first vehicle movement from the real-time first vehicle location to the second location, and wherein the second instruction comprises second navigation instructions to enable the first vehicle movement from the second location to the vehicle queue.

7. The traffic management system of claim 5, wherein the first location is associated with a first service provider, and wherein the processor determines the return time based on at least one of an estimated time duration required by the first service provider to provide a service to the first vehicle and an estimated first vehicle travel time duration from the second location to the vehicle queue.

8. The traffic management system of claim 7, wherein the processor is further configured to:

obtain a service order from the first vehicle or a user device associated with a first vehicle user, when the first vehicle is located at the second location or in the vehicle queue; and transmit the service order to the first service provider.

9. The traffic management system of claim 8, wherein the processor is further configured to:

determine that the estimated time duration required by the first service provider to provide the service to the first vehicle is greater than a predefined time duration threshold or the first service provider is unable to provide the service order;

identify a second service provider located at a third location responsive to a determination that the estimated time duration required by the first service provider to provide the service to the first vehicle is greater than the predefined time duration threshold or the first service provider is unable to provide the service order; and transmit a third instruction to the first vehicle to move to the third location responsive to identifying the second service provider at the third location.

10. The traffic management system of claim 9, wherein the processor identifies the second service provider such that a sum of an estimated time duration required by the second service provider to provide the service to the first vehicle and an estimated travel time duration required by the first vehicle to travel from the vehicle queue to the third location is less than the estimated time duration required by the first service provider to provide the service to the first vehicle.

11. The traffic management system of claim 9, wherein the processor is further configured to:

obtain a user confirmation from the first vehicle or the user device responsive to transmitting the third instruction; and transmit third navigation instructions to the first vehicle to enable a first vehicle movement from the vehicle queue to the third location responsive to obtaining the user confirmation.

12. The traffic management system of claim 8, wherein the processor is further configured to:

determine a presence of a second vehicle in the second location, when the first vehicle moves to the second location; and transmit a vehicle alignment notification to the first vehicle and the second vehicle responsive to determining a second vehicle presence in the second location, wherein the vehicle alignment notification comprises instructions to queue the first vehicle and the second vehicle at the second location based on an order of service deliveries associated with the first vehicle and the second vehicle from the first service provider.

13. The traffic management system of claim 12, wherein the processor is further configured to transmit a request to the second vehicle to fetch the service order for the first vehicle from the first location and return to the second location.

14. The traffic management system 1, wherein the processor is further configured to assign a unique identifier in chronological order to each vehicle in the vehicle queue, wherein the unique identifier is associated with a vehicle identification number.

15. The traffic management system of claim 1, wherein the processor is further configured to:

determine a presence of a third vehicle in proximity to the vehicle queue, wherein the third vehicle is not estimated to join the vehicle queue; and transmit an alert notification to the third vehicle responsive to determining a third vehicle presence, wherein the alert notification indicates a vehicle queue presence at the first location to the third vehicle.

16. A traffic management method comprising:

obtaining, by a processor, inputs from a sensor suite located in proximity to a first location;

determining, by the processor, at least one of a count of vehicles in a vehicle queue in proximity to the first location and a vehicle queue length based on the inputs;

determining, by the processor, that a predefined condition is met when the count of vehicles is greater than a first threshold vehicle count or the vehicle queue length is greater than a second threshold vehicle queue length;

obtaining, by the processor, information associated with the first threshold vehicle queue length and the second threshold vehicle count from a memory;

identifying, by the processor, a point of interest in the vehicle queue based on the information obtained from the memory and the inputs obtained from the one or more sensors, wherein the point of interest comprises a point in the vehicle queue at which the vehicle queue length exceeds the threshold vehicle queue length or a point in the vehicle queue at which the count of vehicles exceeds the threshold vehicle count;

determining, by the processor, a presence of a vehicle behind the point of interest in the vehicle queue based on the inputs, responsive to determining that the predefined condition is met;

transmitting, by the processor, an instruction to the vehicle to move to a second location responsive to determining a vehicle presence, wherein the vehicle is an autonomous vehicle; and automatically moving the vehicle towards the second location responsive to receiving the instruction.

17. A non-transitory computer-readable storage medium having instructions stored thereupon which, when executed by a processor, cause the processor to:

obtain inputs from a sensor suite located in proximity to a first location;

determine at least one of a count of vehicles in a vehicle queue in proximity to the first location and a vehicle queue length based on the inputs;

obtain from a memory information associated with a first threshold vehicle queue length and a second threshold vehicle count;

determine that a predefined condition is met when the count of vehicles is greater than the first threshold vehicle count or the vehicle queue length is greater than the second threshold vehicle queue length;

identify the point of interest in the vehicle queue based on the information obtained from the memory and the inputs obtained from the one or more sensors, wherein the point of interest comprises a point in the vehicle queue at which the vehicle queue length exceeds the threshold vehicle queue length or a point in the vehicle queue at which the count of vehicles exceeds the threshold vehicle count;

determine a presence of a vehicle behind the point of interest in the vehicle queue based on the inputs, responsive to determining that the predefined condition is met;

transmit an instruction to the vehicle to move to a second location responsive to determining a vehicle presence, wherein the vehicle is an autonomous vehicle; and automatically move the vehicle towards the second location responsive to receiving the instruction.

* * * * *